United States Patent [19]
Napierkowski et al.

[11] Patent Number: 5,441,376
[45] Date of Patent: Aug. 15, 1995

[54] STERILIZER LOADING CAR TRANSFER APPARATUS

[75] Inventors: Susan M. Napierkowski; Arthur T. Nagare, both of Erie, Pa.

[73] Assignee: American Sterilizer Company, Erie, Pa.

[21] Appl. No.: 868,912

[22] Filed: Apr. 15, 1992

[51] Int. Cl.⁶ .............................. B65G 69/00
[52] U.S. Cl. ..................... 414/401; 414/396; 414/154; 414/402; 14/71.1; 432/250; 422/300
[58] Field of Search ............ 49/70; 414/380, 385, 414/396, 400, 331, 401, 402, 584, 551, 538, 154; 432/239, 241, 250; 14/69.5, 71.1, 71.3, 71.5, 72.5; 422/219, 232, 286, 300, 301; 238/218; 104/100, 103

[56] References Cited

U.S. PATENT DOCUMENTS

| 1,550,141 | 8/1925 | Bennington | 104/89 |
| 2,523,749 | 9/1950 | Wilson | 414/401 X |
| 3,261,650 | 7/1966 | Stromqvist | 414/401 X |
| 3,266,644 | 8/1966 | Ipsen | 414/196 |
| 3,298,546 | 1/1967 | Jones | 414/154 X |
| 3,630,439 | 12/1971 | Cook | 414/154 X |
| 4,003,714 | 1/1977 | Foglino et al. | 414/154 X |
| 4,203,697 | 5/1980 | Cayton | 414/396 X |
| 5,224,812 | 7/1993 | Oslin et al. | 414/401 X |

FOREIGN PATENT DOCUMENTS

| 276231 | 11/1969 | Austria | 414/401 |
| 301159 | 5/1971 | U.S.S.R. | 414/401 |

Primary Examiner—Frank E. Werner
Attorney, Agent, or Firm—Jones, Day, Reavis & Pogue

[57] ABSTRACT

An apparatus for transferring a loading car to a sterilizer chamber having a frame defining an opening, the apparatus comprises a chamber track adapted for supporting the loading car and wherein the chamber track is positioned within the chamber; a carriage track adapted for supporting the loading car and wherein the carriage track is configured to extend parallel to and in axial alignment with the chamber track; connecting devices mounted on an end of the carriage track; and a bridge having a top surface and a bottom surface, the bridge pivotally mounted adjacent the opening of the chamber wherein the bridge may pivot between an open and a closed position, the top surface adapted for supporting the loading car, and the bridge having receiving devices adapted for receiving the connecting devices when the bridge is in the open position.

7 Claims, 11 Drawing Sheets

STERILIZER LOADING CAR TRANSFER APPARATUS

BACKGROUND OF THE INVENTION

1. Field of the Invention

The present invention relates to a sterilizer loading car transfer apparatus, and more particularly, to an autolocking, self-aligning sterilizer loading car transfer system.

2. Description of the Background of the Invention

The present invention is described as it is used for sterilizers, more particularly, wall mounted sterilizer units. Such description is for illustrative purposes only and is not intended to so limit the invention.

Wall-mounted sterilizer units are typically mounted such that the sterilizer chamber is supported in a position generally behind a wall. A front panel with the associated controls is typically positioned on the outside of that wall. Sterilizer doors typically may open either by hinges or by means of a sliding mechanism.

If a vertically sliding door is used, that door is typically placed behind the panel. The configuration of such a wall-mounted sterilizer may form an eight to ten inch "tunnel" from the outside of the sterilizer front panels to the chamber tracks located within the sterilizer chamber. As such, the ability to roll loading cars from a transfer carriage to the chamber is hindered.

To solve this problem, previous transfer carriages have been designed wherein the transfer carriage tracks extend the length of the transfer carriage plus eight to twelve inches beyond the front end of the transfer carriage in order to bridge the gap between the transfer carriage and the chamber tracks. Extending the transfer carriage tracks in this manner permits the loading car to be rolled from the transfer carriage to the chamber, but such an extension also causes several problems which are outlined below.

An obvious problem with extended transfer carriage tracks is safety in that the extended transfer carriage tracks can cause personal injury. Also, such extensions can dent, scratch, or otherwise harm the exterior panels or the interior of the sterilizing chamber. Furthermore, such extensions can cause the loading car and carriage to tip as the loading car moves along the transfer carriage tracks and alters the combined center of gravity of the loading car and transfer carriage.

Another problem with such a sterilizer configuration and extended transfer carriage tracks is that it is difficult to guide the transfer carriage such that the transfer carriage tracks properly align with the chamber tracks. It is also difficult to keep the transfer carriage tracks in lines parallel to the chamber tracks and perpendicular to the chamber opening. Such misalignment may result in the loading car tipping or otherwise being uncontrollable.

Another problem with the alignment of the transfer carriage tracks with the chamber tracks in such configurations is that often the chamber tracks are not installed level with respect to the horizontal plane. Due to welding tolerances and a sloped and/or uneven sterilizer chamber bottom, the installed chamber tracks may be uneven. Such installation creates the possibility of the loading car unintentionally rolling out from the chamber toward the door opening.

Further, securing the transfer carriage to the chamber during loading and unloading is typically accomplished using hard to maneuver springs and latches.

Yet another problem with respect to alignment is that the loading car obstructs the view of the sterilizer chamber as the transfer carriage is maneuvered to the sterilizer. Such transfer carriages, because of the track extensions described above, are necessarily controlled from behind and thus adequate control and alignment becomes highly dependent upon the size of the person. Personal safety and equipment or property damage is a significant possibility depending on the size and experience of the operator.

SUMMARY OF THE INVENTION

In view of the foregoing, it is an object of the present invention to provide a sterilizer loading car apparatus which overcomes these and other problems. In accordance with the present invention, an apparatus for transferring a loading car to a sterilizer chamber is provided. The apparatus comprises a chamber track adapted for supporting the loading car wherein the chamber track is positioned within the chamber, a carriage track adapted for supporting the loading car wherein the carriage track is configured to extend parallel to and in axial alignment with the chamber track, and connecting means mounted on an end of the carriage track. A bridge having a top surface and a bottom surface wherein the bridge is pivotally mounted adjacent the opening of the chamber is also provided. The bridge may pivot between an open and a closed position. The top surface is adapted for supporting the loading car and the bridge has receiving means adapted for receiving the connecting means when the bridge is in the open position.

The present invention also provides for a vertically sliding chamber door having a top and wherein the bottom surface of the bridge is adapted to move responsive to vertical movements of the top of the chamber door. Means for releasing the connecting means from the receiving means is also provided. The means for releasing may be remotely activated.

According to one embodiment of the invention, the connecting means comprises a latch and said receiving means comprises a slot adapted for receiving the latch.

According to another embodiment of the invention, adjusting means for leveling the chamber track with respect to the chamber is provided.

According to another embodiment of the invention, the transfer carriage has a guide member extending therefrom and the bridge has a generally U-shaped notch adapted for receiving the guide member therein.

Still yet another embodiment of the invention provides an apparatus for aligning a loading car with a sterilizer chamber wherein the loading car has at least one top horizontal member. The apparatus for aligning comprises an alignment mark mounted above the center of the sterilizer chamber and a sight pin mounted on the top and at the center of each top horizontal member.

Accordingly, the present invention overcomes many of the aforementioned problems. There is no longer a need to have carriage tracks extend beyond the transfer carriage, thereby significantly reducing the risk of personal injury or equipment damage. As there is no such extensions the possibility of tipping due to the transfer of the center of gravity of the loading car on the transfer carriage is reduced. The guide member and notch combination, together with the alignment marking and sight pins make it easier to guide the transfer carriage such that the transfer carriage tracks properly align with the chamber tracks.

The adjustable supports for the chamber tracks significantly reduce the problems associated with uneven or unlevel chamber tracks. As such, it is possible to install level chamber tracks regardless of the slope of the bottom of chamber itself. Finally, the automatic latching feature of the present invention and the remote release of such latches greatly improves safety and convenience.

BRIEF DESCRIPTION OF THE DRAWINGS

For the present invention to be clearly understood and readily practiced, a preferred embodiment will now be described, by way of example only, wherein.

DETAILED DESCRIPTION OF THE PREFERRED EMBODIMENT

Figure 1:
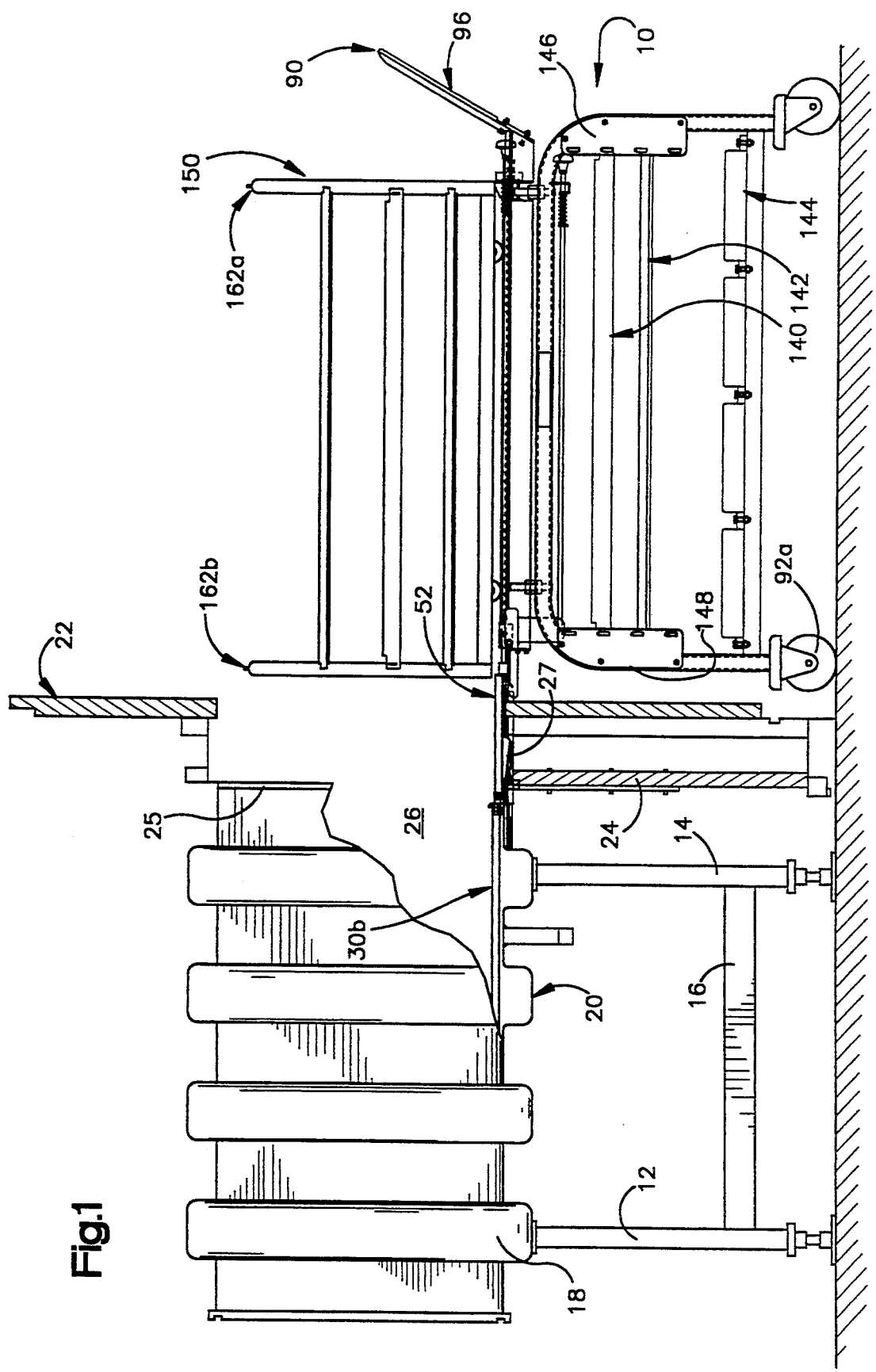
FIG. 1 is a side elevational view of the apparatus of the present invention.

Referring now to FIG. 1, there is shown a sterilizer loading car transfer apparatus, generally referred to by the numeral 10, which has been constructed according to the present invention. This invention will be described, by way of example only, with respect to a large, wall mounted sterilizer unit with a vertically sliding door and a mobile transfer carriage, but is not intended to be so limited to such application.

Figure 2:
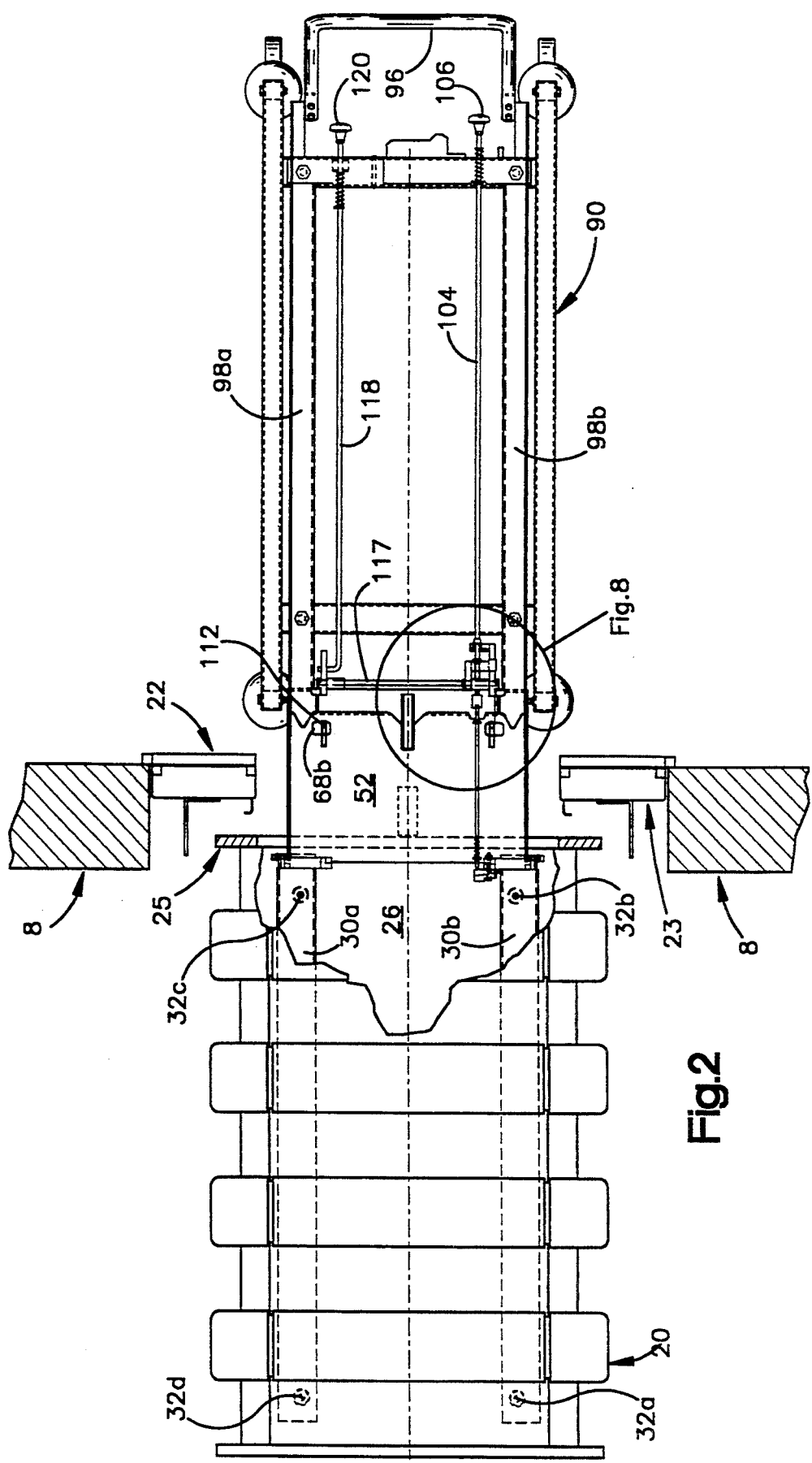
FIG. 2 is a top view of the apparatus of the present invention.

More particularly and with reference to FIGS. 1 and 2, the loading car transfer apparatus 10 comprises a sterilizer unit 20 and a transfer carriage 90 to be used in conjunction with a loading car 150. The sterilizer unit 20 is typically supported by leg members 12, 14 and cross members 16 as is known in the art. The body 18 of the sterilizer unit 20 is typically secured behind a panel 22. The sterilizer 20 is mounted behind a wall 8. A front panel 22 houses the controls (not shown) attached to the control box 23 for the sterilizer unit 20 and is typically placed such that the front panel 22 overlaps the exterior of the wall 8.

Figure 6:
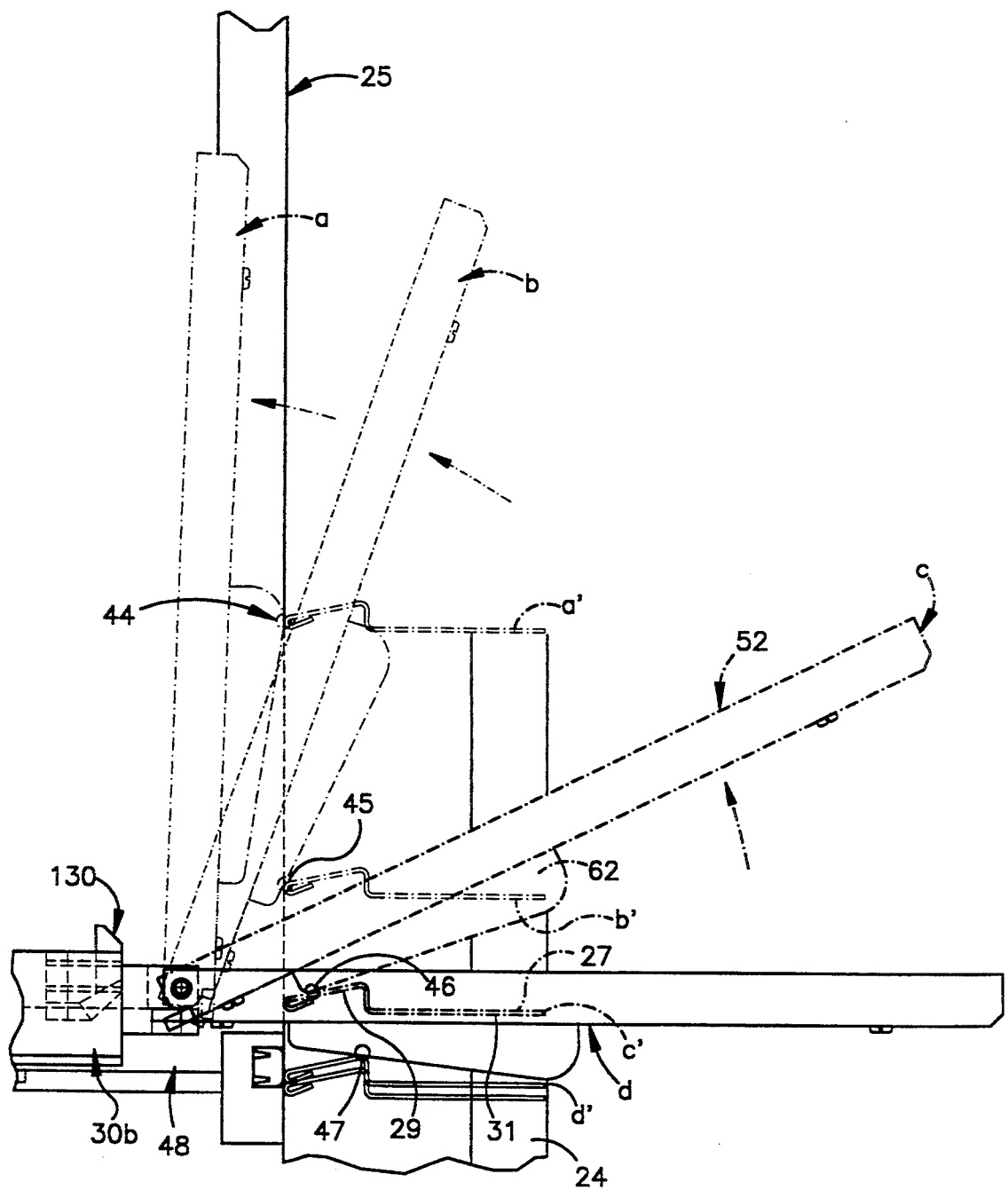
FIG. 6 is a side elevational view of the bridge in various positions ranging from full up to fully extended positions.

As seen in FIGS. 1 and 2, the sterilizer 20 has a vertically sliding door 24 which covers the chamber end frame opening 25. The vertically sliding door 24 and the transport mechanisms for that vertically sliding door are generally as known in the art. A cover 27 is on top of the door 24. The cover 27 may be fixed to the door 24 or may be integrally formed with the door 24. As can be seen in FIG. 6, the cover 27 generally has an inclined portion 29 and a flat portion 31. The inclined portion 29 slopes generally upwardly away from the chamber 26. The purpose of the cover 27 will be described in further detail herein.

FIGS. 1 and 2 show a partial cross-section of the sterilizer 20 wherein the internal sterilizing chamber 26 can be seen. Along the chamber bottom 28 of the sterilizing chamber 26 are two chamber tracks 30a, 30b. The chamber tracks 30a, 30b extend the length of the sterilizer chamber 26 and are substantially parallel to each other within the sterilizer chamber 26. The chamber tracks 30a, 30b are mounted on identical adjustable supports 32a, 32b, 32c, 32d. The top portion of the chamber tracks 30a, 30b is configured to support the rollers 152 on the loading car 150.

Figure 3:
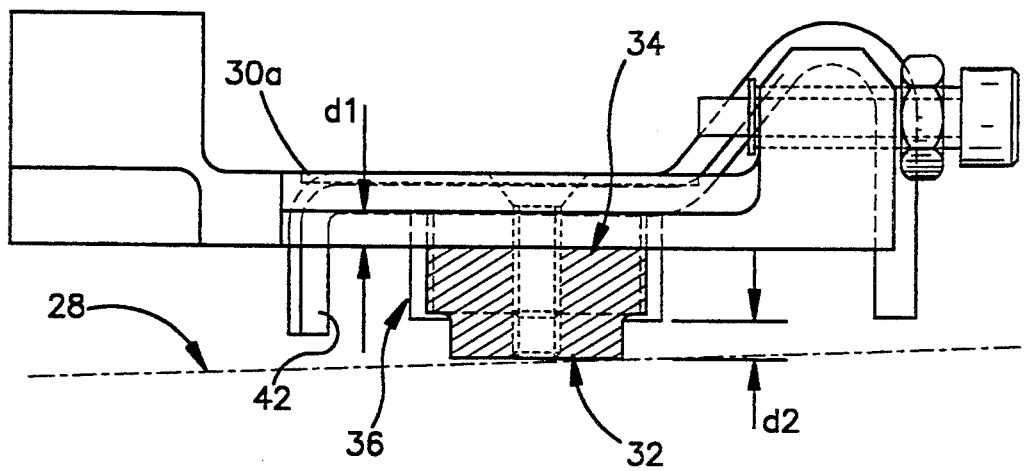
FIG. 3 is a front elevational view of the track end block and adjusting mechanism for one of the chamber tracks.
Figure 15:
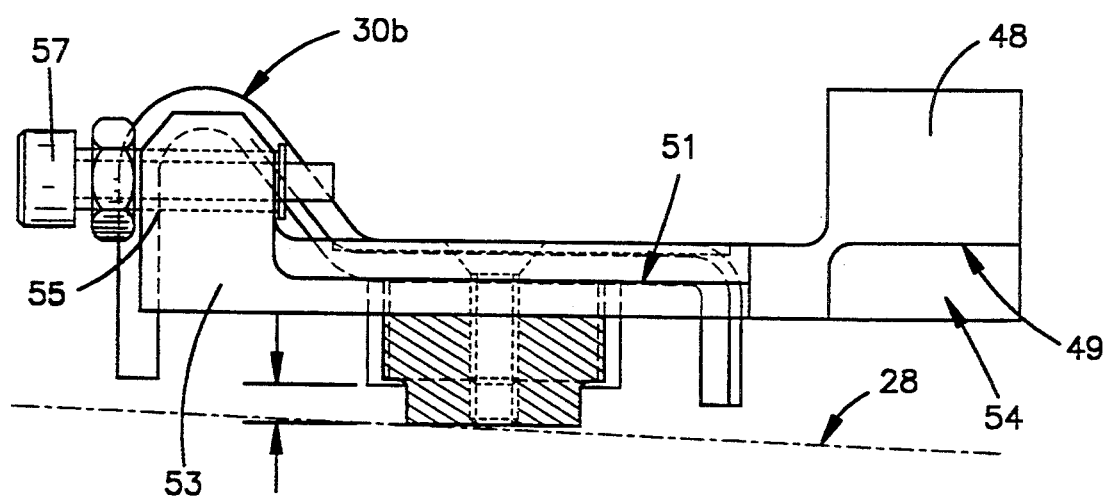
FIG. 15 is a front elevational view of the track end block and adjusting mechanism for the chamber track not shown in FIG. 3.

FIGS. 3 and 15 show identical adjustable supports 32c and 32b, respectively. Adjustable support 32c comprises an externally threaded boss 34 mounted on the chamber bottom 28 and an internally threaded sleeve 36. The boss 34 may, for example, be welded on the chamber bottom 28 and may, for example, be one and one-eighth (1⅛) inches in diameter. The boss 34 also has a blind tapped hole 38 in the middle. The sleeve 36 is sized to fit circumferentially around the boss 34 such that the internal threads of the sleeve 36 are drivingly engaged with the external threads of the boss 34. The adjustable support 32c is adjusted to a desired height by turning the sleeve 36 with respect to the boss 34. The height may be set so that the top of the chamber track 30a is at the required height from the floor and may, for example, be nominally about three-fourths (¾) of an inch above the chamber bottom 28 and eleven-thirty-seconds (11/32) of an inch above the chamber end frame opening 25. The range for the adjusting support 32c should preferably be such that sleeve 36 is, for example, thirteen/sixty-fourths (13/64) of an inch upwardly adjustable, shown as distance d1 on FIG. 3, and three-sixteenths (3/16) of an inch downwardly adjustable, shown as distance d2 on FIG. 3.

Figure 4:
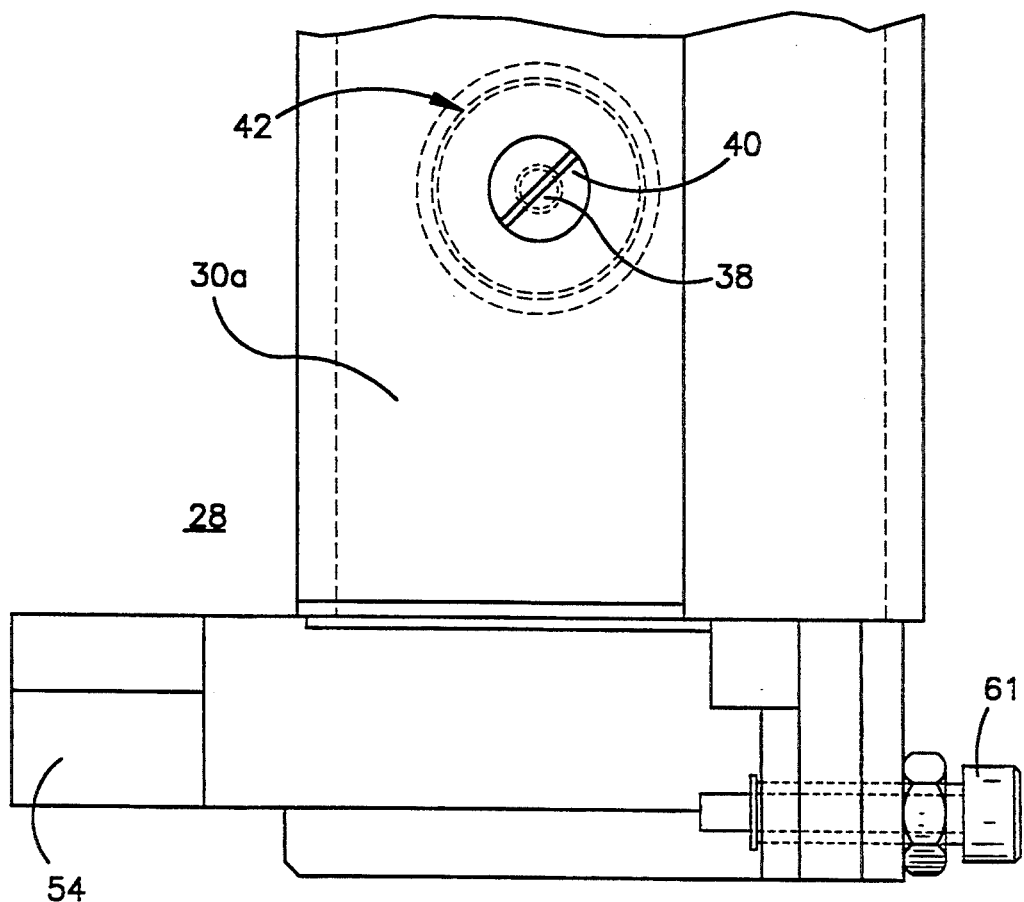
FIG. 4 is a top elevational view of the chamber track as mounted on the adjusting mechanism.

The other adjustable supports 32a, 32b, 32d are all set in a similar manner as that described for adjustable support 32c such that the chamber tracks 30a, 30b may be installed level with respect to the horizontal plane and at the required heights as described above. On the underside of the chamber track 30a, 30b is a track mount 42 configured to interface with the adjustable supports 32a, 32b, 32c, and 32d. As can be seen in FIG. 4, track mount 42 of the chamber tracks 30a, 30b are set on top of the sleeves 36, (others not shown). The chamber tracks 30a, 30b are secured using a bolt 40 through the center hole 38 of the boss 34. The bolt 40 is preferably a flat head locking screw. The bolt 40 locks the sleeve 36 in place and provides for flush mounting. In a similar manner, the other end of chamber track 30a and each end of chamber track 30b are secured to the adjusting supports 32a, 32b, 32d, respectively.

Figure 5:
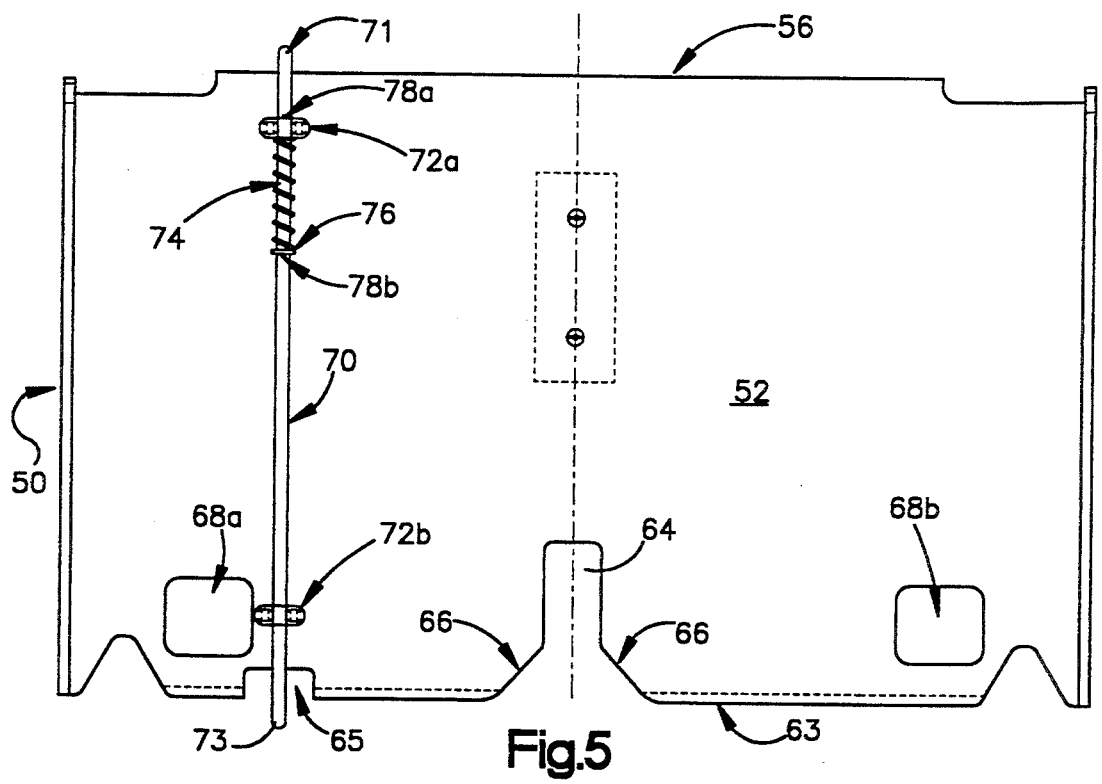
FIG. 5 is a top plan view of the bridge assembly of the present invention.

Referring now to FIGS. 1, 2, and 5 there is shown a bridge 52 in the horizontal position. Because of the extreme temperatures of the sterilizing cycle and for convenience of operation, the bridge 52 is designed to automatically fold out from the sterilizer chamber 26 when the door 24 is opened and automatically fold up toward the sterilizer chamber 26 when the sterilizer door 24 is closed.

To this end, the bridge assembly 50 is pivotally mounted on the chamber bottom 28 adjacent the chamber end frame opening 25. With reference to FIGS. 5 and 6, the bridge assembly 50 is pivotally mounted such that the bridge 52 leans outwardly from the sterilizer chamber 26 against the sterilizer door 24 when the sterilizer door 24 is in the up position.

The bridge assembly 50 is mounted using a free floating pivot means. As can be seen in FIGS. 12 through 15, the bridge has two pivot pins 57, 61, one of which will be described below. The pivot pin 57 is preferably a cantilevered shouldered screw which is screwed into a hole 55 in the track end pivot block 48. The pivot pin 57 may, for example, be three-sixteenths (3/16) of an inch in diameter. The pivot pin 57 is positioned in oversized hole 58, which may for example, be five-sixteenths (5/16) of an inch in diameter. As such, the pivot pin 57 is non-concentric with the hole 58 and moves with the movement of the bridge 52. The oversized hole 58 allows the pivot pin 57 to move in relation to the hole, and accordingly, allows the pivot point itself to move. That allows the load on the pivot pin 57 to be shifted as the bridge 52 rotates.

With reference to FIGS. 3, 4, 12, 13, 14, and 15, the track end block 48a is provided with a horizontal tab 53 for the bridge to sit on and a notched back 54 in the same plane as the horizontal tab 53. That allows the bridge's horizontal rear edge lay flat on the horizontal tab 53 of the track end block 48a, while the tab 56 underlays the notch out 54 in the track end block 48a. As the bridge 52 rotates to the fully open position (FIG. 14) the load is transferred off the pivot pins 57, 61 onto and into the track end block 48a. The load is shared between surfaces 49, 51, while the load on the pivot pins 57, 61 is reduced to zero. A similar configuration is used on track end block 48b.

Figure 7:
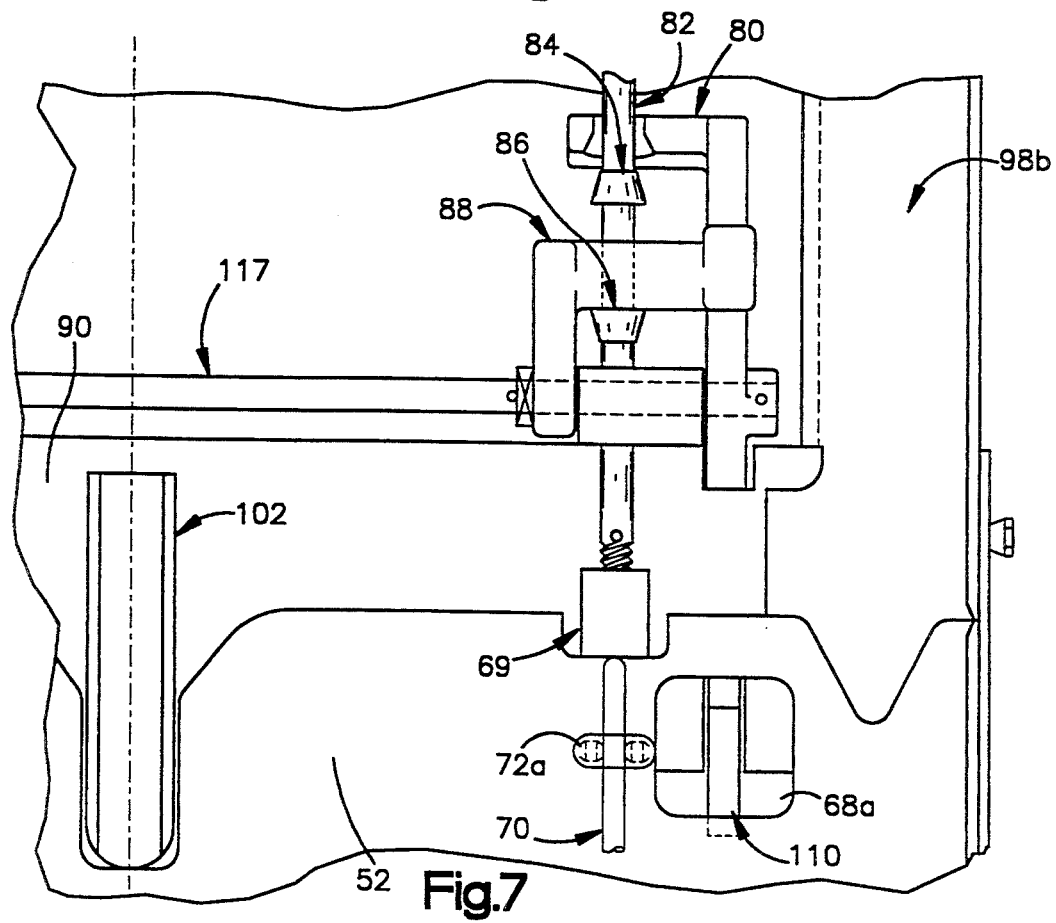
FIG. 7 is a blow-up of a the circled portion VIII of FIG. 3 showing the lock mechanism in an actuated position.

Preferably, the bridge 52 will have a range of motion such that the bridge 52 will be about eighty-eight (88) degrees as measured from the horizontal plane when the sterilizer door 24 is in the closed position (position "a") and about zero (0) degrees from the horizontal plane when the sterilizer door 24 is open (position "d"), as shown in FIG. 7. Because the sterilizer door 24 opens vertically downward, the bridge 52 will open accordingly due to gravity.

To facilitate the bridge 52 movement in response to the sterilizer door 24 movement, a bridge slide 62 is positioned on the underside of the bridge assembly 50.

The bridge slide 62, preferably constructed of teflon material, is shaped such that it mates with the inclined portion 29 of the door cover 27 which is installed on top of the sterilizer door 24.

The pivotal movement of the bridge 52 will now be described with reference to FIG. 6 which shows a bridge 52 in various positions. Position "a" shows the bridge 52 in a full up position. The bridge 52 is in the full up position when the position of the door 24 ranges from being fully closed to being open as far as shown by position "a'". At the position "a'", the cover 27 and the bridge slide 62 meet at contact point 44.

As the door 24 continues to be vertically lowered, the bridge slide 62 slides along the cover 27. The gravitational pull on the bridge 52 causes the bridge 52 to open as the cover 27 permits When the door 24 reaches position "b'", the bridge will have opened to position "b". Similarly, as the door 24 continues to be vertically lowered, the bridge slide 62 continues to slide along the cover 27. When the door 24 reaches position "c'", the bridge 52 will have been opened to position "c" due to the gravitational force.

Finally, when the door 24 is completely lowered such that the door is in position "d'", the bridge will reach its fully open position, designated as position "d" in FIG. 6.

The size of the bridge 52 may vary and is dependent upon the size of the sterilizer unit 20 and the mounting of such sterilizer unit 20 relative to the wall 8. The width of the bridge 52 preferably substantially corresponds to the distance between the chamber tracks 30a, 30b. The length, or span, of the bridge 52 should be such that when the sterilizer door 24 is fully open (position "d") and the bridge 52 is extended, the bridge 52 at least spans the distance between the sterilizer chamber 26 and the front panel 22.

As shown in FIGS. 5 and 7, the end 63 of the bridge 52 which is opposite the tab 56 has a notch 64 therein. The notch 64 is generally U-shaped with a lead-in chamfer 66. A rectangular notch 65 for receiving a push rod tip 69 is also along the end 63 of the bridge 52. Also on the bridge 52 are two rectangular slots 68a, 68b, configured to receive latch hooks 110, 112 as detailed below. The rectangular slots 68a, 68b are preferably spaced such that the distance between the rectangular slots 68a, 68b corresponds substantially to the inside distance of the chamber tracks 30a, 30b.

The bridge assembly 50 also contains a push rod 70 secured to the bridge assembly 50 using two guide blocks 72a, 72b as shown in FIG. 5. A spring 74 is placed around the push rod 70 such that the spring is positioned adjacent to the guide block 72a closest to the tab 56. A flat washer 76 is positioned around the push rod 70 on the other side of the spring 74. Roll pins 78a, 78b are inserted through the push rod 70 and positioned on the opposite sides of the guide block 72a and flat washer 76, respectively, so as to act as limits for the push rod 70. One end 71 of the push rod 70 preferably extends beyond the pivot axis 56. The other end 73 of the push rod 70 preferably extends beyond the end 63 of the bridge assembly 50 and passes through the rectangular notch 65 therein. The push rod 70 and spring 74 assembly form a portion of the track lock 130 briefly described below.

Figure 10:
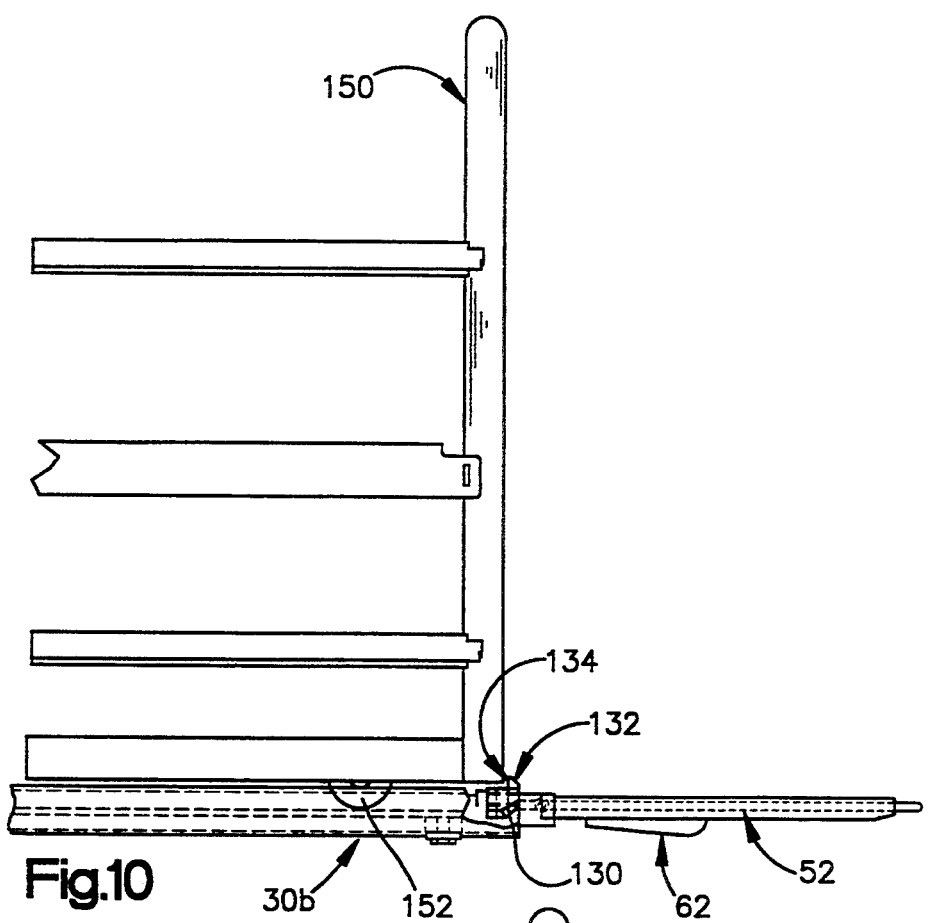
FIG. 10 is a side elevational view of the loading car inside a chamber with the lock mechanism at its normal at rest position.
Figure 11:
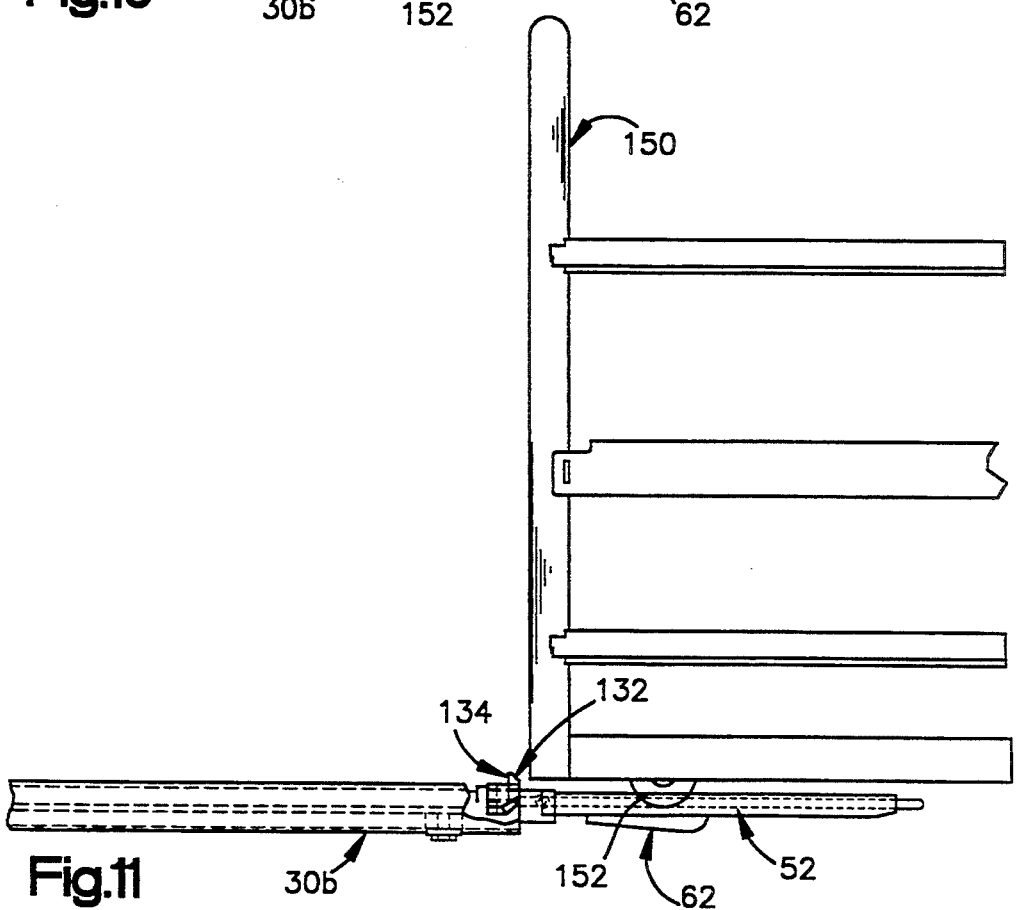
FIG. 11 is a side elevational view of the loading car outside a chamber with the lock mechanism at its normal at rest position.
Figure 12:
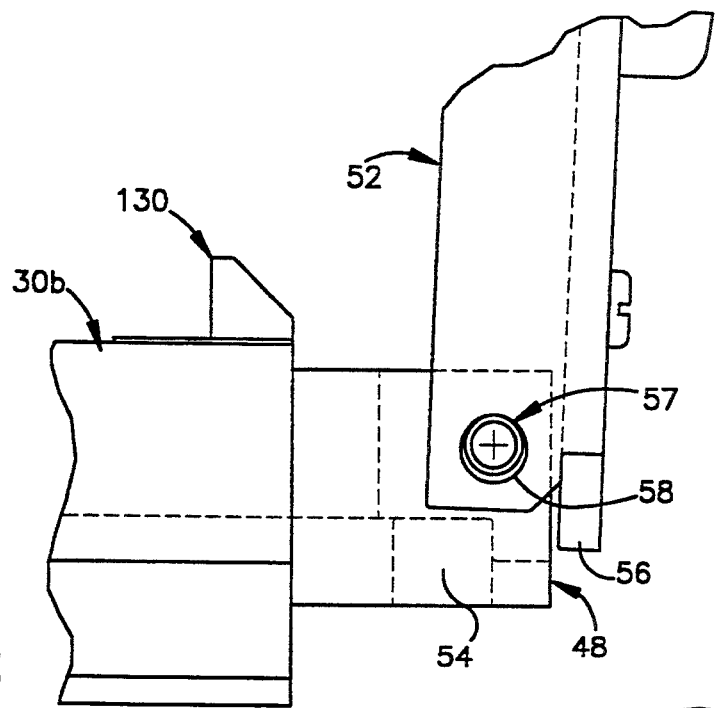
FIG. 12 is a side elevational view of the floating pivot with the bridge in the closed position.
Figure 13:
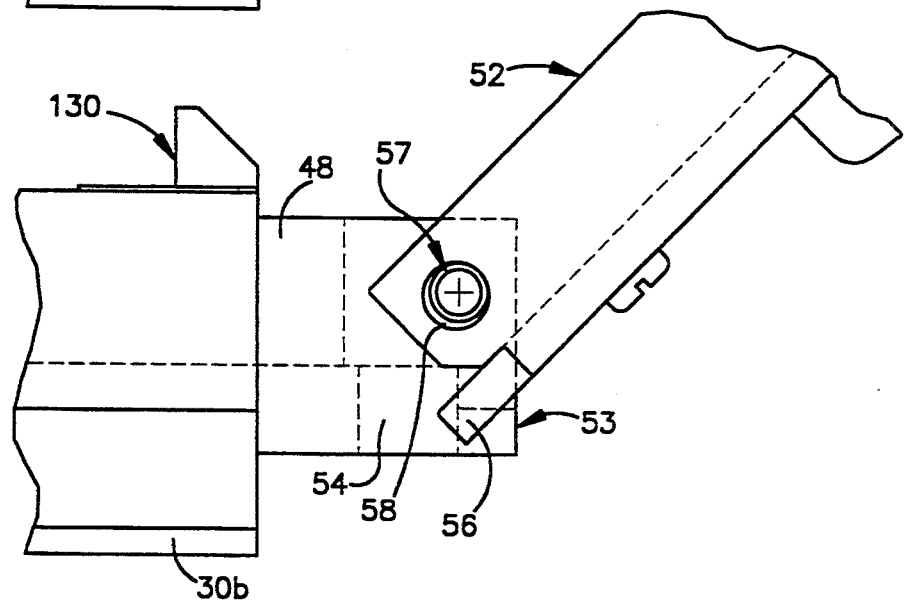
FIG. 13 is a side elevational view of the floating pivot with the bridge angled at forty-five degrees.
Figure 14:
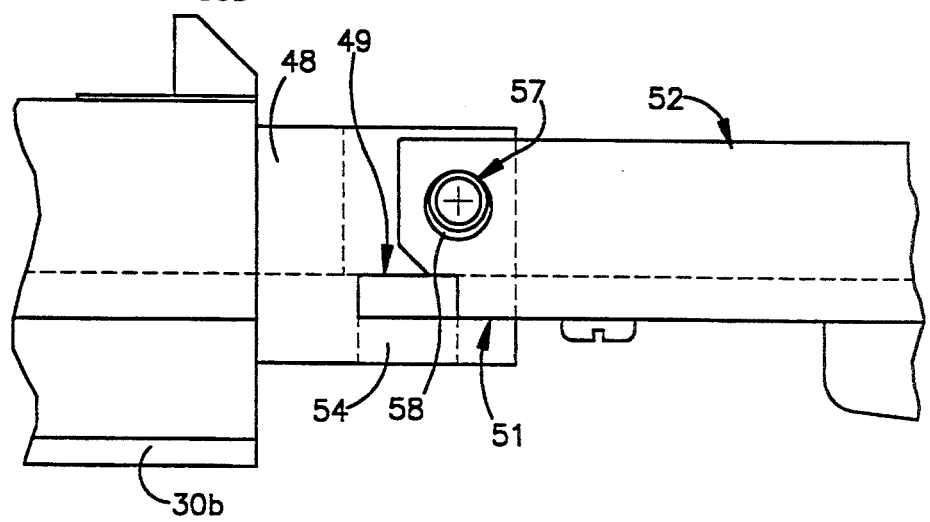
FIG. 14 is a side elevational view of the floating pivot with the bridge in the fully open position.

To prevent unwanted or uncontrolled backward rolling of the loading car 150 along the chamber tracks 30a, 30b, an internal automatic track lock 130 is provided. As can be seen in FIG. 10, the track lock 130 comprises a blocking member 134 with lead-in chamfering 132 facing the outside of the chamber 26. The track lock 130 is pivotally mounted perpendicular to the end of the chamber track 30a as shown in FIG. 11 such that the track lock 130 is normally locked. As the loading car 150 is rolled along the bridge 52 and onto the chamber tracks 30a, 30b, the loading car 150 rotates the track lock 130 forward, allowing the loading car 150 to pass into the chamber 26.

Once the loading car 150 is completely within the chamber 26, the track lock 130 is raised, thereby preventing the loading car 150 from rolling in reverse. Upon release, the track lock 130 rotates in the opposite direction, thereby allowing the loading car to be rolled out of the chamber. The track lock 130 is disclosed in detail in U.S. patent application of Susan M. Napierkowski, Arthur T. Nagare, and Richard J. Verga for Indirect Lock and Lock Release Mechanism being filed concurrently herewith, said application being hereby incorporated by reference.

Referring generally to FIGS. 1 and 2, the transfer carriage 90 is shown. The transfer carriage 90 rolls on wheels 92a, 92b, (others not shown) attached to support member 94, (other not shown). The transfer carriage 90 is typically pushed from behind using the handle 96. Transfer carriage tracks 98a, 98b are connected to the top of the support members 94, (not shown), respectively. The transfer carriage tracks 98a, 98b are configured for supporting the rollers 152a, 152b, (others not shown) of the loading car 150 and are placed parallel to each other at distance which substantially corresponds to the width of the loading car 150, that is, the distance between the roller 152a and the corresponding opposite roller (not shown) and the roller 152b and the corresponding opposite roller (not shown).

The end 100 of the transfer carriage 90 opposite the handle 96 has a guide member 102 which forms a male extension on the end 100 of the transfer carriage 90. Such guide member 102 may be welded to the transfer carriage 90 or may be integrally formed thereon. The guide member 102 is designed to cooperate and interlock with the notch 64 on the bridge 52. The guide member 102 preferably has a rounded end such that it will generally follow the lead-in chamfer 66 into the notch 64. The configuration of the notch 64, the lead-in chamfer 66, and the guide member 102 is such as to allow for automatically guiding the transfer carriage 90 even if the transfer carriage 90 is not perfectly aligned.

Figure 8A:
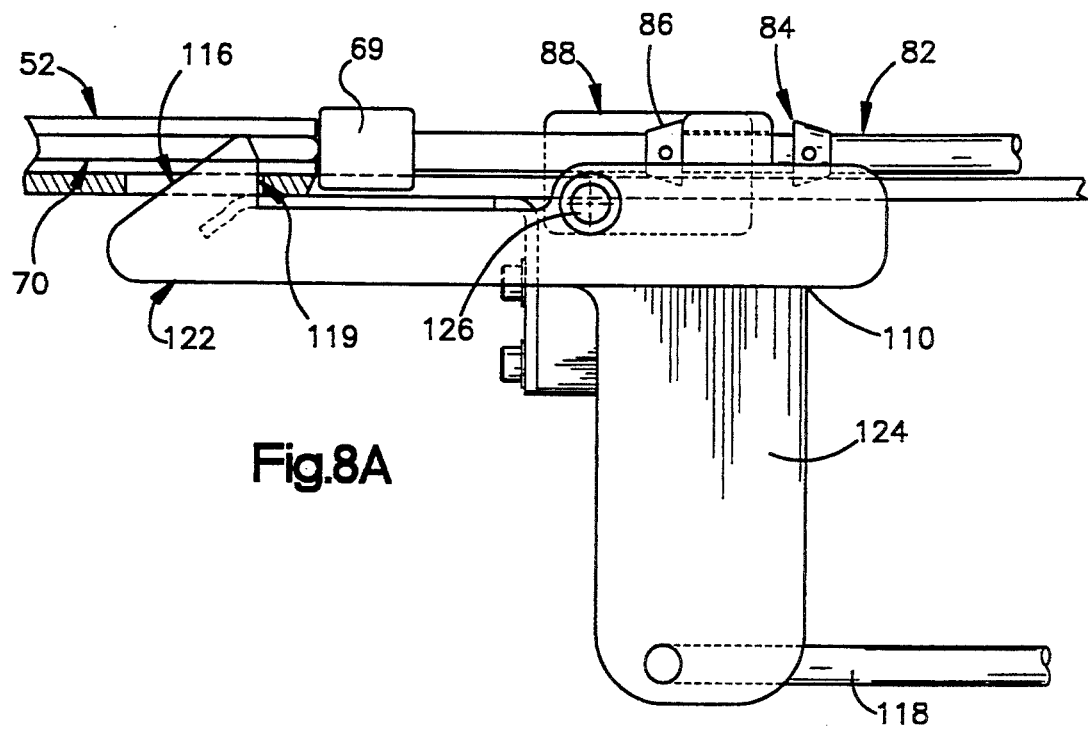
FIG. 8a is a side elevational view of the carriage latch hook with the latch hook and push rods in locked position.

The transfer carriage 90 has two latch hooks 110, 112. As shown in FIG. 8a, the latch hook 110 comprises a latching arm 122, a release arm 124, and a pivot pin 126. The latching arm 122 is shaped with an angled front lead-in 116 with a vertically notched back end 119. The front lead-in 116 permits the latch hook 110 to slide under the bridge 52 as the transfer carriage 90 is pushed toward the open sterilizer chamber 26. Because the bridge 52 is pivotally mounted in the sterilizer chamber 26, the bridge 52 rotates up the incline of the front lead-in 116. The bridge 52 rotates upward until the latch hook 110 is positioned beneath the rectangular slot 68a. When the latch hook 110 and the rectangular slot 68a are sufficiently aligned, the bridge 52 will drop due to gravitational forces, thereby interlocking the latch hook 110 and the rectangular slot 68a. In a similar manner, the other latch hook 112 interlocks with rectangular slot 68b. FIG. 8a illustrates the latch hook 110 and rectangular slot 68a in a locked position.

The latch hooks 110, 112 are connected to each other by cross rod 117 as shown in FIG. 2. A single pull rod 118 is connected to the cross rod 117 such that the pull rod 118 may release both latch hooks 110, 112 simultaneously. A knob 120 is attached to the pull rod 118 such that an operator may release the latch hooks 110, 112 from behind the transfer carriage 90. The latch hooks 110, 112 are geometrically shaped and have their pivot points 126,(not shown) located such that the latch hooks 110, 112 may return to their normal up or locked position due to gravity. No spring return mechanism is needed.

Figure 8B:
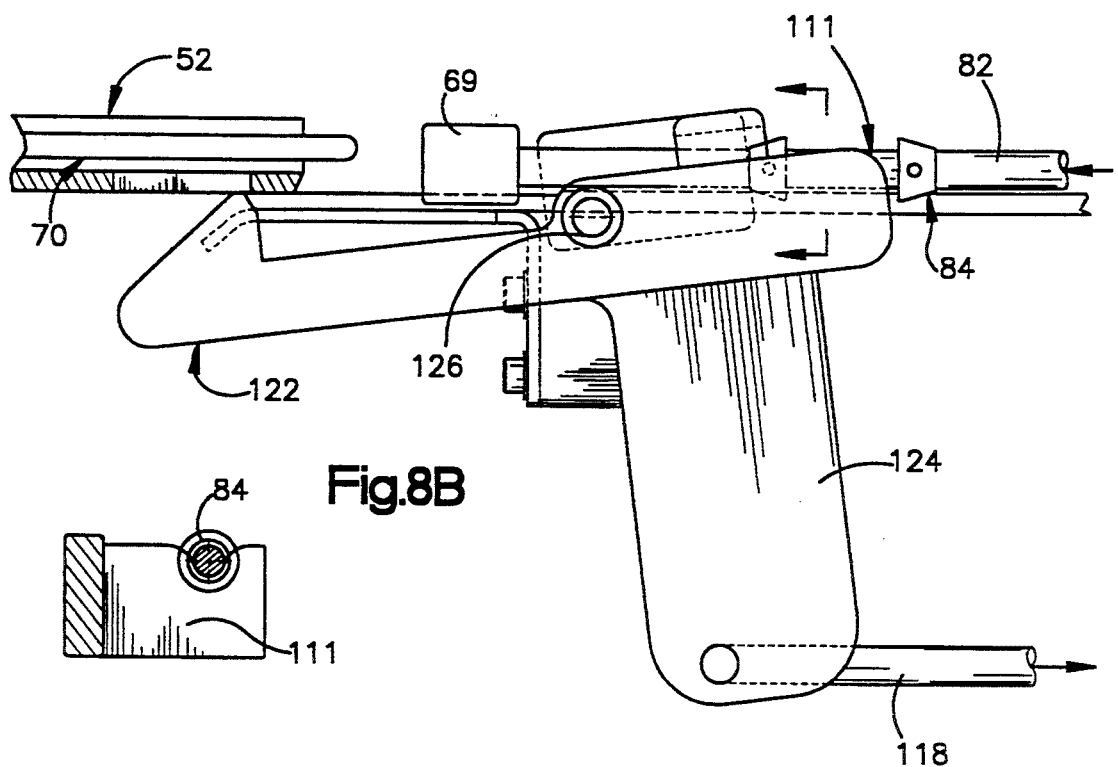
FIG. 8b is a side elevational view of the carriage latch hook shown in non-lock position.

As shown in FIG. 8b, when the pull rod 118 is pulled back toward the operator, the latch hooks 110, 112 rotate counterclockwise about their respective pivot points 111, (other not shown), thereby releasing the latch hooks 110, 112 from the rectangular slots 68a, 68b. There is a fail-safe feature such that releasing the latch hooks 110, 112 will not release the track lock 130. As the pull rod 118 causes the latch 110 to rotate about pivot point 126, a slotted bracket 111 on the latch 110 raises up and blocks the conical stop 84 from being moved forward toward the chamber 26. This in turn prevents the push rod tip 69 from engaging the push rod 70 and activating the release mechanism on the track lock 130. Accordingly, when the latches 110, 112 are released, the track lock 130 will not be simultaneously inadvertently released. This is an important safety feature in that the loading car 150 is prevented from rolling out of the sterilizer chamber 26 without the transfer carriage 90 properly aligned with and secured to the bridge 52.

Figure 8C:
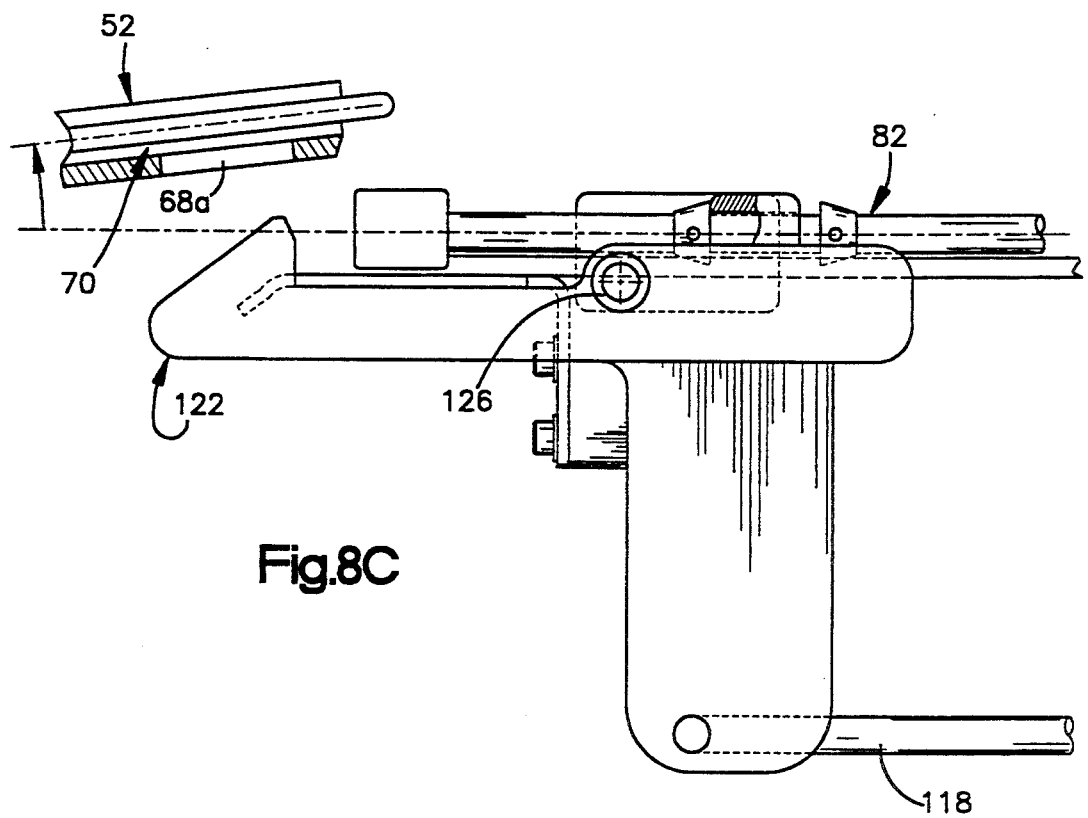
FIG. 8c is a side elevational view of the carriage latch hook showing the bridge being locally released from a locked position.

FIG. 8c illustrates another safety feature of the latch hook 110, 112 and rectangular slot 68a, 68b system. In that figure, the bridge 52 is raised due to the door 24 of the sterilizer unit 20 being raised vertically while the transfer carriage 90 is hooked to the bridge 52. Because of the vertically notched back-end 119, there is no downward forces in the connection between the latch hook 110 and the rectangular slot 68a. Accordingly, the upward force from the upward vertical movement of the door 24 is sufficient to release the latch 110 from the slot 68a. Similarly latch 112 is released from slot 68b.

Figure 8D:
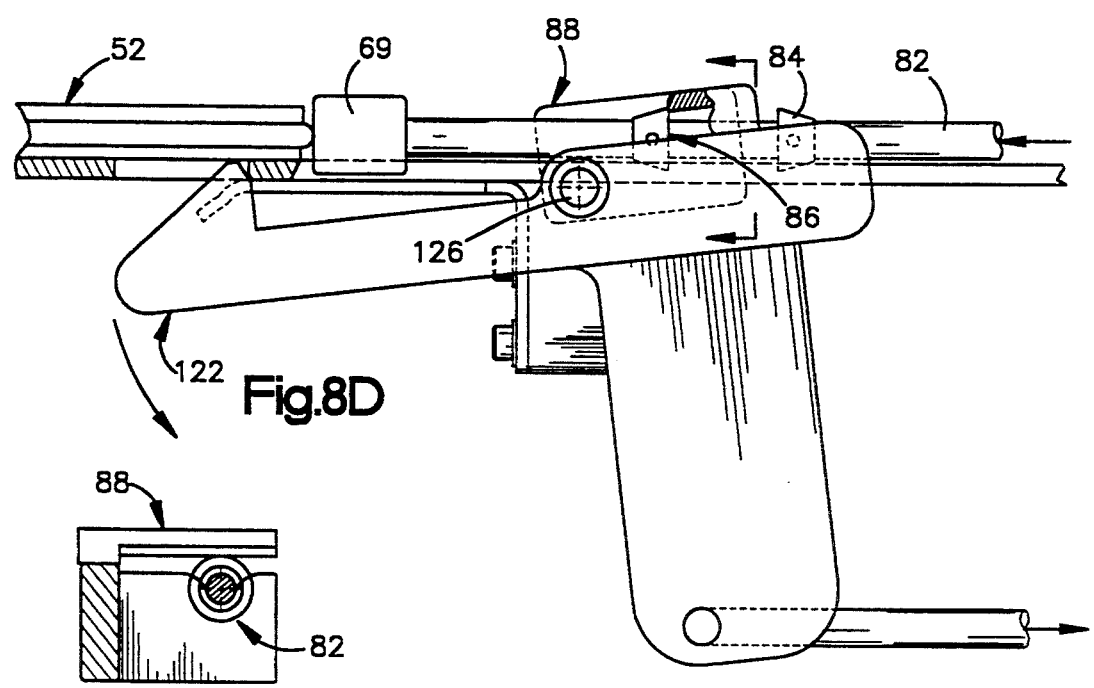
FIG. 8d is a side elevational view of the carriage latch hook showing the automatic reset feature.
Figure 9:
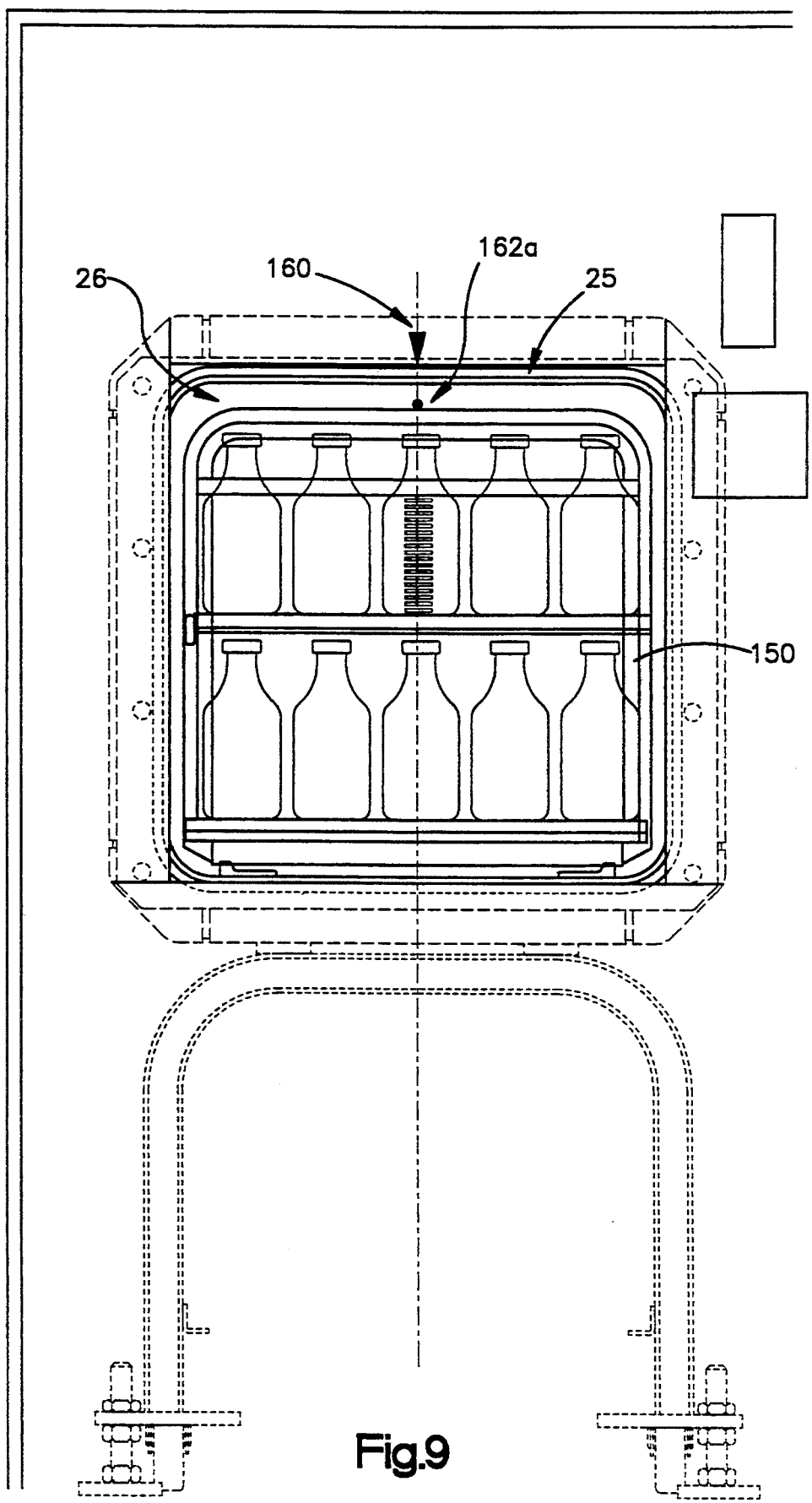
FIG. 9 is a front elevational view of the sterilizer unit panel and loading car showing the alignment mechanism.

With reference to FIG. 8d, the automatic reset feature is shown. The automatic reset feature is operated by pushing the carriage push rod 82 by knob 106 toward the chamber 26. This in turn causes the conical stop 86 to raise the latch release bar 88 when the pull rod 118 is activated to release latch 110. As such, the spring loaded carriage push rod 82 may retreat and the conical stops 82, 84 may reset, thereby activating the track lock 130 release mechanism.

With reference to FIG. 1, there is shown a storage location on the transfer carriage 90 for extra shelves (not shown), shelf supports 142, and side gates 140. On each of the horizontal members (not shown) of the transfer carriage 90 is mounted a square plastic bar (not shown). Plastic mounting bolts (not shown) are positioned such that the mounting bolts form dividers in which the shelves (not shown) may fit.

Corner brackets 146, 148 are mounted on the vertical carriage legs 143, 145, respectively. The brackets 146, 148 contain four slots 147, 149 capable of holding two side gates 140 and 2 shelf supports 142 when not in use.

Finally, to aid in the alignment of the transfer carriage 90 with the chamber 26, sight pins 162a, 162b are positioned along the horizontal cross members 156a, 156b of the loading car 150. Such sight pins 162a, 162b may, for example, be three-eighths (⅜) of an inch in diameter with a spherically shaped end and be three-eighths (⅜) of an inch high. The sight pins 162a, 162b preferably are aligned in the geometric center of the horizontal cross members 156a, 156b, respectively.

An alignment mark 160 is mounted on the outside of the sterilizer top panel 22 at the geographic center of the chamber 26. As the transfer carriage 90 is being moved to the chamber 26, the sight pins 162a, 162b may be aligned with the alignment mark 160 from the rear of the transfer carriage 90 thereby facilitating proper alignment.

It will be understood that variations and changes in the details of the apparatus which have been herein described and illustrated to explain the present invention may be made by those skilled in the art without departing from the spirit, principle, and scope of the present invention. For example, the size and number of chamber tracks, transfer carriage tracks and loading cart rollers may be varied. Tracks may be added to the top of the bridge 52. Accordingly, it is expressly intended that all such equivalents, variations and changes therefrom which fall within the principle and scope of the present invention as described herein and defined in the claims be embraced thereby.

What is claimed is:

1. An apparatus for transferring loading car to a chamber, said apparatus comprising:
   a chamber which defines an interior chamber volume for receiving said loading car;
   a vertically movable chamber door which alternately opens and closes an opening of said chamber;
   a chamber track adapted for supporting the loading car, said chamber track positioned within the chamber volume;
   a carriage track adapted for supporting the loading car, said carriage track configured to extend parallel to and in axial alignment with said chamber track;
   connecting means mounted on an end of said carriage track;
   a bridge having a top surface and a bottom surface, said bridge includes a pivotal mounting which is mounted substantially adjacent the opening of the chamber wherein said bridge may pivot between an open and a closed position, said top surface adapted for supporting the loading car, and said bridge having receiving means adapted for receiving said connecting means when said bridge is in the open position and aligning the chamber track with the carriage track while in the open position, so as to permit the loading car to be transferred to the chamber; and
   wherein said bottom surface is configured to incline into mechanical contact with said chamber door so that as said chamber door is opened, said bridge is gravitationally pivoted to the open position.

2. The apparatus of claim 1 wherein the chamber door is a vertically sliding chamber door having a top and wherein said bottom surface is configured to incline against the top of the chamber door so as to move responsive to vertical movements of said chamber door.

3. The apparatus of claim 2 further comprising means for releasing said connecting means from said receiving means.

4. The apparatus of claim 3 wherein said means for releasing is remotely activated.

5. The apparatus of claim 4 wherein said connecting means comprises a hook and said receiving means comprises a slot adapted for receiving said hook.

6. The apparatus of claim 2 further comprising adjusting means for leveling said chamber track with respect to said chamber.

7. The apparatus of claim 1 further including a transfer carriage which has a guide member extending therefrom and wherein said bridge has a generally U-shaped notch adapted for receiving said guide member.

* * * * *